(12) United States Patent
Yamanaka et al.

(10) Patent No.: US 7,469,848 B2
(45) Date of Patent: Dec. 30, 2008

(54) GRATER

(75) Inventors: Shunji Yamanaka, Tokyo (JP); Hisato Ogata, Tokyo (JP); Eugene Kaneko, Astoria, NY (US)

(73) Assignee: Helen of Troy Limited, St. Michael (BB)

( * ) Notice: Subject to any disclaimer, the term of this patent is extended or adjusted under 35 U.S.C. 154(b) by 0 days.

(21) Appl. No.: 11/288,501

(22) Filed: Nov. 29, 2005

(65) Prior Publication Data

US 2007/0119995 A1   May 31, 2007

(51) Int. Cl.
*A47J 43/25* (2006.01)
(52) U.S. Cl. .................................. 241/95; 241/273.1
(58) Field of Classification Search ................ 241/169, 241/273.1, 273.2, 95, 168, 83; D7/678, 669, D7/679; 220/908, 908.1, 675
See application file for complete search history.

(56) References Cited

U.S. PATENT DOCUMENTS

| | | | | | |
|---|---|---|---|---|---|
| 198,554 | A | * | 12/1877 | White | 222/409 |
| 692,466 | A | * | 2/1902 | Morris | 222/241 |
| 1,166,748 | A | * | 1/1916 | Cochran | 16/344 |
| 1,344,039 | A | * | 6/1920 | Jenson | 222/189.07 |
| 2,024,917 | A | * | 12/1935 | Franze | 99/506 |
| D152,677 | S | * | 2/1949 | De Vault | D7/678 |
| 2,690,307 | A | * | 9/1954 | Mantelet | 241/92 |
| 2,714,908 | A | * | 8/1955 | Carmack | 241/95 |
| 3,825,049 | A | * | 7/1974 | Swett et al. | 220/771 |
| 5,022,559 | A | * | 6/1991 | Condon | 222/109 |
| 5,088,392 | A | * | 2/1992 | Ancona et al. | 99/499 |
| D393,986 | S | * | 5/1998 | Joergensen | D7/678 |
| D438,763 | S | * | 3/2001 | Hood et al. | D7/678 |
| D440,129 | S | * | 4/2001 | Young et al. | D7/678 |
| 7,178,687 | B1 | * | 2/2007 | Manderfield et al. | 220/675 |
| 2003/0218020 | A1 | * | 11/2003 | Gilliam et al. | 220/669 |
| 2004/0217219 | A1 | * | 11/2004 | Bitonto et al. | 241/95 |
| 2006/0157599 | A1 | * | 7/2006 | Klotz et al. | 241/95 |
| 2007/0032764 | A1 | * | 2/2007 | Lampropoulos | 604/317 |

FOREIGN PATENT DOCUMENTS

| | | |
|---|---|---|
| JP | 59-122843 | 7/1984 |
| JP | 3034276 | 2/1991 |
| JP | 3080813 | 4/1991 |
| JP | 2566495 | 11/1992 |
| JP | 5-39437 | 2/1993 |
| JP | 5-95439 | 4/1993 |
| JP | 7-236578 | 9/1995 |
| JP | 2001-286404 | 10/2001 |

OTHER PUBLICATIONS

Information Disclosure Statement dated Feb. 10, 2006.

* cited by examiner

*Primary Examiner*—Faye Francis
(74) *Attorney, Agent, or Firm*—Seyfarth Shaw LLP

(57) ABSTRACT

A grater for cutting, slicing and grating food. The grater including a housing having a peripheral wall structure and a base cooperating to define a receptacle. The housing including a skirt portion extending away from the receptacle and being engageable by a user's hand to hold the housing in place on an underlying support surface. The grater includes a blade carried by the housing. The skirt portion receives a user's hand in a grasping position to simultaneously engage the skirt portion and the underlying support surface.

24 Claims, 5 Drawing Sheets

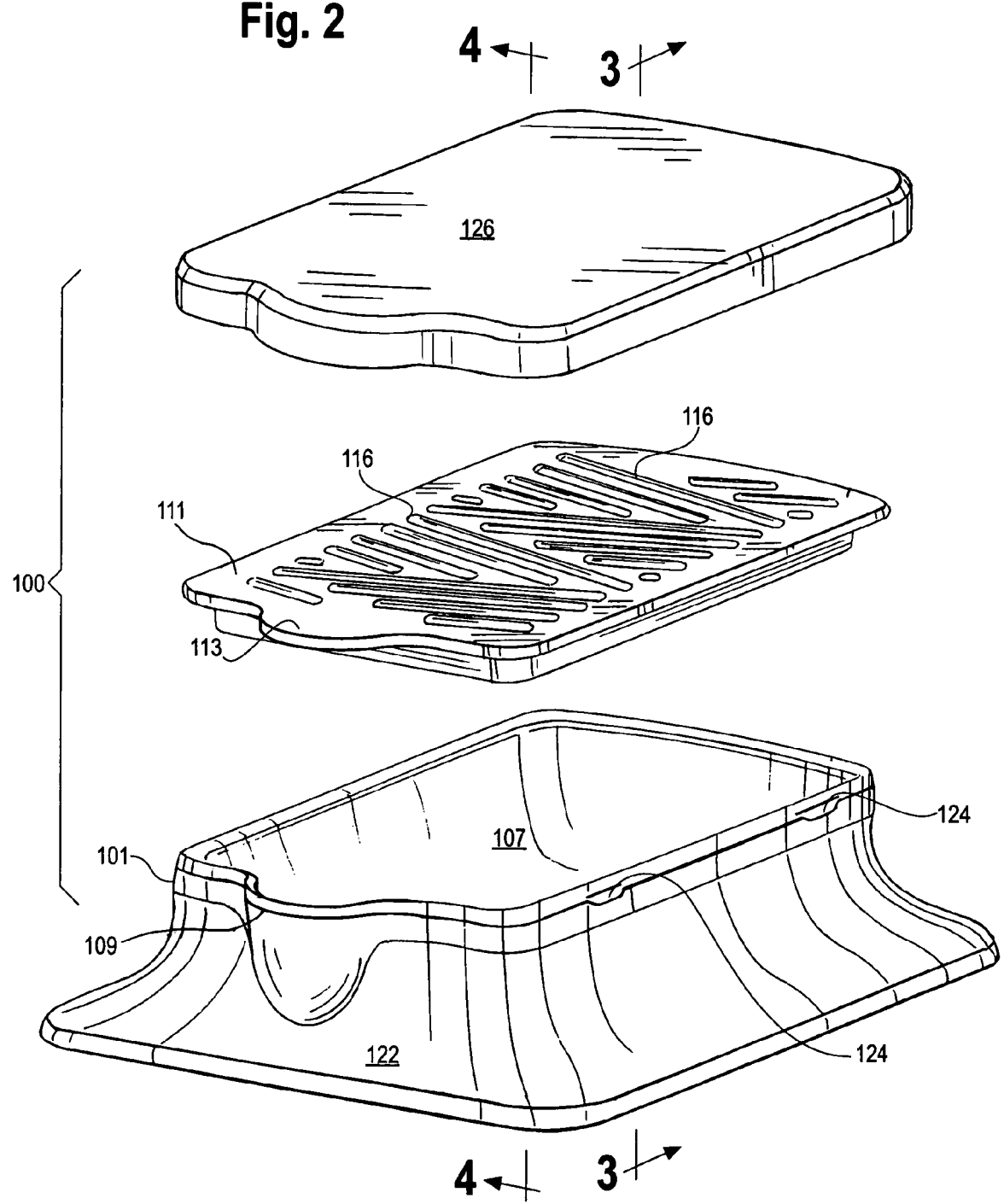

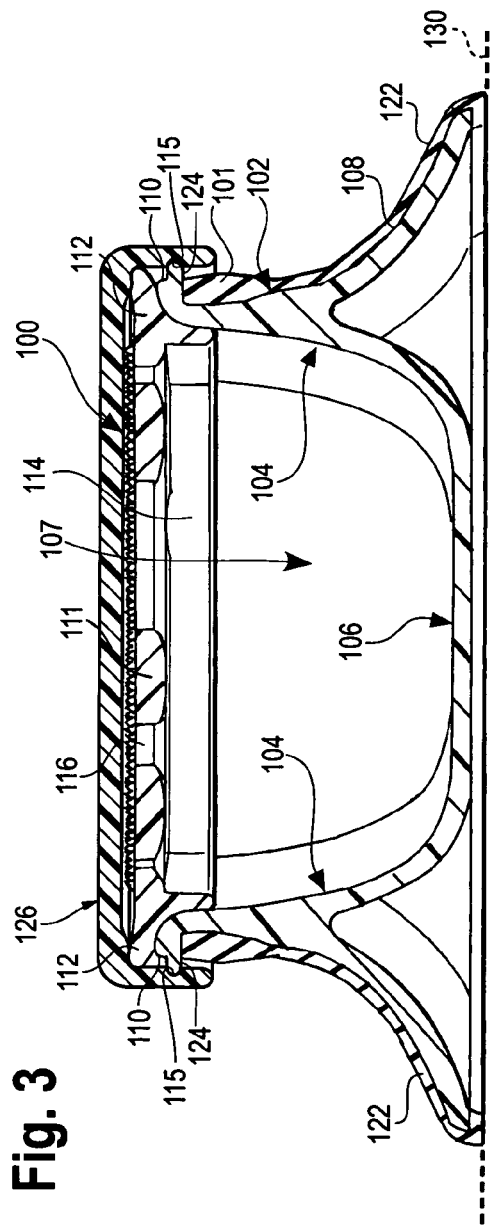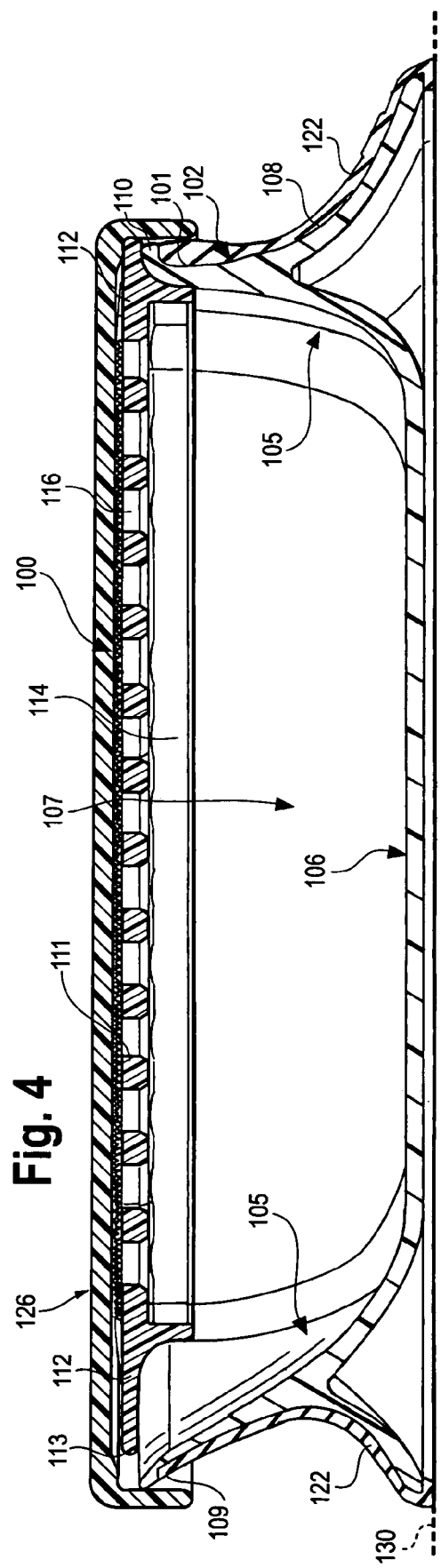

GRATER

BACKGROUND

The present invention is directed generally to kitchen utensils or appliances and, more specifically, to food graters which cut, slice or grate food items.

There are several different types of utensils or appliances which cut, slice, grind, grate or process food items in a number of different ways. Some of these devices enable a user to manually process the food items. For example, a food mill typically includes a container, a blade positioned in the bottom of the container and a handle portion which is connected to the blade. A user rotates or turns the handle to correspondingly rotate or turn the blade to process a food item inserted into the container. The processed food item comes out of the bottom of the food mill and falls into a separate container, such as a bowl.

Another manually operated device is a conventional handheld grater such as a cheese or vegetable grater. Such graters typically have a relatively thin housing including a blade. The blade includes several openings and relatively small blade-like protrusions which are positioned adjacent to the openings. A user holds the grater in one hand and manually slides a food item, such as a block of cheese, on the top surface of the blade to cut or slice the food item into smaller pieces. The smaller food pieces or particles may drop from the bottom surface of the grater into a separate container, such as a bowl.

Other graters combine containers and blades into one device. These graters generally include a container defining an opening and a blade portion which is seated in the opening. Some of these containers also include a handle which extends from one end of the grater and is used to carry and/or hold the grater. Typically a user grasps the extended handle in one hand and slides or moves a food item over the blade using the other hand as described above to cut or slice the food item into smaller particles. The cut or sliced particles fall from the bottom surface of the blade into the container. The blade is removed to access the processed food in the container.

One problem with conventional food graters is that it is difficult to hold the food grater in position using a side-extended handle while sliding or moving the food product along the blade. The force associated with the movement of the food product over the blade tends to move the entire grater in the same direction as the movement of the food product. It is difficult to hold these graters in place using one hand, because if a downward force is applied to the handle to hold the grater down, the grater tends to tip or rock. As a result, grating the food products using these types of graters can be difficult and time consuming.

Another problem with conventional container/blade type graters is that they often slip or move during use. In some situations users place wet towels or cloths underneath the graters to minimize slipping. Alternatively, some food graters include feet or legs which have non-skid or non-slip material attached to the bottom of the legs. Other food graters have a non-skid or non-slip pad attached to the bottom of the graters to prevent slipping or sliding. However, such food graters are still difficult to hold in position because of the positioning of the handles on these graters and the difficulty of holding the food graters against the surface supporting the food grater, as described above.

Accordingly there is a need for an improved food grater which enables the user to stably hold the food grater in position on a support surface using one hand while sliding a food product over the blade portion of the grater using the other hand.

SUMMARY

The present invention is directed to a grater and, more specifically, to a grater for a food item which enables a user to securely hold the grater against a support surface while grating the food item.

One embodiment of the grater of the present invention provides a housing including a peripheral wall structure and a base cooperating to define a receptacle. The housing including a skirt portion extending away from the receptacle and being engageable by a user's hand to hold the housing in place on an underlying support surface. The grater also including a blade carried by the housing, The skirt portion receiving a user's hand in a grasping position to simultaneously engage the skirt portion and the underlying support surface.

In an embodiment, the grater includes a grip connected to the skirt portion of the housing. In another embodiment, the grip is made of at least one of the materials selected from the group consisting of: a polymer and an elastomer.

In an embodiment, the housing defines a spout operable to drain fluid from the receptacle.

In another embodiment, the housing is made of at least one of the materials selected from the group consisting of: stainless steel, wood, glass, a polymer and an elastomer.

In an embodiment, the blade defines a plurality of openings and includes a plurality of protrusions adjacent to the openings. In one embodiment, the protrusions have two different sizes. In another embodiment, the protrusions are positioned on each side of each opening and angle substantially inwardly.

In an embodiment, the grater includes a cover removably connected to the housing.

In another embodiment, the cover includes a protruding member positioned and shaped to overlie the spout for cooperating therewith to define a gap for draining fluid from the grater that collected in the receptacle.

In an embodiment, wherein the protruding member cooperates with an adjacent portion of the skirt portion to define spaced supports to enable the grater to stand substantially vertically on the support surface.

Another embodiment of the present invention provides a grater for processing a food item including a container including a skirt portion which extends downwardly and away from the container. The skirt portion engageable by a user's hand to hold the container in place on an underlying support surface. The grater includes a grip attached to the skirt portion to inhibit movement of the container along the support surface. The grater also includes a blade carried by the container. The skirt portion and attached grip are adapted to receive a user's hand in a grasping position, wherein the user's hand simultaneously engages at least one of the skirt portion and the attached grip, as well as the underlying support surface to securely hold the container in place on the support surface.

In an embodiment, the grip is made of a substantially non-slip material.

In another embodiment, the grip is made of at least one of the materials selected from the group consisting of: a polymer and an elastomer.

In another embodiment, the container defines a spout operable to drain fluid from the container.

In an embodiment, the housing is made of at least one of the materials selected from the group consisting of: stainless steel, wood, glass, a polymer and an elastomer.

In another embodiment, the blade defines a plurality of openings and includes a plurality of protrusions adjacent to the openings.

In an embodiment, the protrusions have two different sizes. In another embodiment, the protrusions are positioned on each side of each opening and angle substantially inwardly.

In another embodiment, the grater includes a cover removably connected to the container.

In another embodiment, the cover includes a protruding member positioned and shaped to overlie the spout for cooperating therewith to define a gap for draining fluid from the grater that collected in the container.

In an embodiment, wherein the protruding member cooperates with an adjacent portion of the skirt portion to define spaced supports to enable the grater to stand substantially vertically on the support surface.

It is therefore an advantage of the present invention to provide a grater which is easily controllable and very stable during use.

Another advantage of the present invention is to provide a grater which is comfortable to use.

A further advantage of the present invention is to provide a grater which is aesthetically desirable and appropriate to be placed on a table during meals.

Another advantage of the present invention is to provide a grater which is easy and inexpensive to manufacture.

A further advantage of the present invention is to provide a grater having a spout and a blade which cooperate to act as a strainer for removing and draining fluid from a grated food item.

A further advantage of the present invention is to provide a grater which can by stored horizontally or vertically to maximize storage space.

Other features and advantages of the invention will be apparent from the following detailed disclosure, taken in conjunction with the accompanying sheets of drawings, wherein like numerals refer to like parts, elements, components, steps and processes.

DESCRIPTION OF THE FIGURES

FIG. 2 is an exploded perspective view of the grater of FIG. 1, including a cover.

FIG. 3 is a cross section view taken substantially along line 3-3 in FIG. 2.

FIG. 4 is a cross section view taken substantially along line 4-4 in FIG. 2.

DETAILED DESCRIPTION

Figure 1:
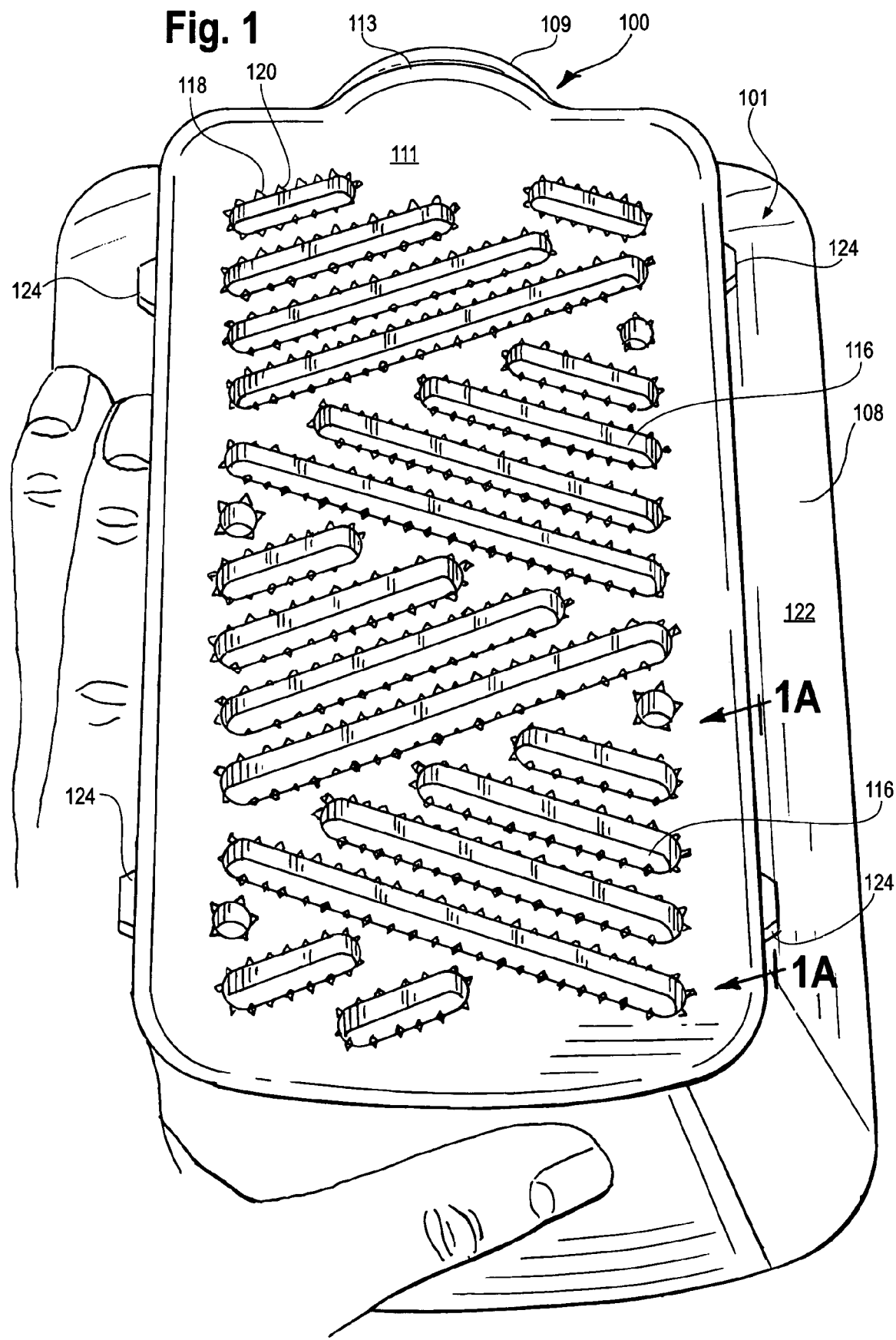
FIG. 1 is a top perspective view of one embodiment of the grater of the present invention.

Referring to FIGS. 1, 1A, 2, 3, 4 and 5, in one embodiment, a grater 100 includes a housing or container 101. The housing 101 includes a peripheral wall structure 102 having two side walls 104 and two end walls 105, the structure 102 closed at its lower ends by a bottom wall or base 106 for cooperating therewith to define an open-top receptacle 107 for receiving cut, sliced or grated food products or food items. The lower ends of the side walls 104 and end walls 105 have a generally tapered or curved shape. It should be appreciated that the end walls 105 and side walls 104 may be sloped or angled at any suitable angle and may have a suitable configuration.

In the illustrated embodiment, the housing 101 includes an outer wall or skirt portion 108 which is connected to the peripheral wall structure 102 and extends downwardly and laterally outwardly therefrom away from the base 106 of the housing. It should be appreciated that the outer wall or skirt portion may extend from a portion of the perimeter or periphery of the housing or the entire perimeter or periphery of the housing. In the illustrated embodiment, the lower or bottom end of the skirt portion 108 may be in substantially the same plane as the bottom surface or base 106 of the housing 101. It should be appreciated that the skirt portion 108 may extend from the top of the housing, the bottom of the housing or any intermediate position on the housing. As shown in FIGS. 3 and 4, the lower or bottom end of the skirt portion 108 is in substantially the same plane as the bottom wall or base 106 of the housing 102 and is spaced laterally outwardly therefrom. It should be appreciated that the bottom of the skirt portion 108 may be disposed in any suitable plane or planes. The outer walls or skirt portion 108 enables a user to place a hand flatly on top of the skirt portion 108 to hold the grater 100 firmly against the support surface 130.

In one embodiment, the tops of the side walls 104 and end walls 105 of the housing 101 include lips 110 which overhang a portion of the side and end walls. In the illustrated embodiment, the lips 110 are integrally formed with the housing 101.

In one embodiment, a blade portion or blade 111 is positioned over the open-top receptacle 107 and is seated in or carried by the housing 101. The blade 111 includes flanges 112 which extend over the lips 110 of the housing 101 to enable the blade 111 to be carried by the housing. The blade 111 may be loosely placed on the top of the housing 102 and seated in the open-top receptacle 107 as shown in FIGS. 3 and 4. Alternatively, the blade 111 may be seated in the opening defined by the housing 101 and connected to the housing such as be a friction fit or snap fit connection. To this end, the blade has a peripheral depending wall 114.

In the illustrated embodiment, the housing 101 defines a spout 109 at one end to enable the grater to be used as a strainer. A user tilts or tips the housing 101 including the blade 111 to drain or pour off any fluid collected in the receptacle 107 during or after using the grater. As best illustrated in FIGS. 1, 2 and 4, the blade 111 includes a rounded protruding member 113 is dimensioned and positioned to overlie the spout 109. As shown in FIGS. 1 and 4, the protruding member 113 extends over a portion of the spout 109 to create a gap or space between the opening of the spout 109 and the protruding member 113. The gap is sized to enable a fluid or liquid collected by the receptacle 107 to be poured from the spout 109 into a container, sink or the like and to keep cut, sliced or grated food items in the container. It should be appreciated that the spout 109 and the protruding member 113 may be any suitable size or shape and may be positioned at any suitable location on the housing.

In one embodiment, the blade 111 defines a plurality of openings or holes 116. The openings or holes 116 may be divided into different groups of openings or holes where the groups of openings are positioned at angles on the blade. It should be appreciated that one or more of the openings 116 or groups of the openings may be positioned at the same or different angles on the blade. It should also be appreciated that the openings may be positioned at any suitable configuration or arrangement.

In the illustrated embodiment, a plurality of first protrusions or first cutting members 118 are positioned adjacent to the openings or holes 116 and extend generally upwardly away from the top surface of the blade 111. A plurality of second protrusions or second cutting members 120 are also positioned adjacent to the openings or holes 116 and are alternately positioned between the first protrusions 118. In the illustrated embodiment, the first and second protrusions are positioned about the perimeter of each of the openings 116. The first protrusions 118 are larger than the second protrusions 120. It should be appreciated that the first and second protrusions may be any suitable sizes or shapes and positioned about a portion or the entire perimeter of the openings 116 or in any suitable location on the blade 111.

Figure 1A:
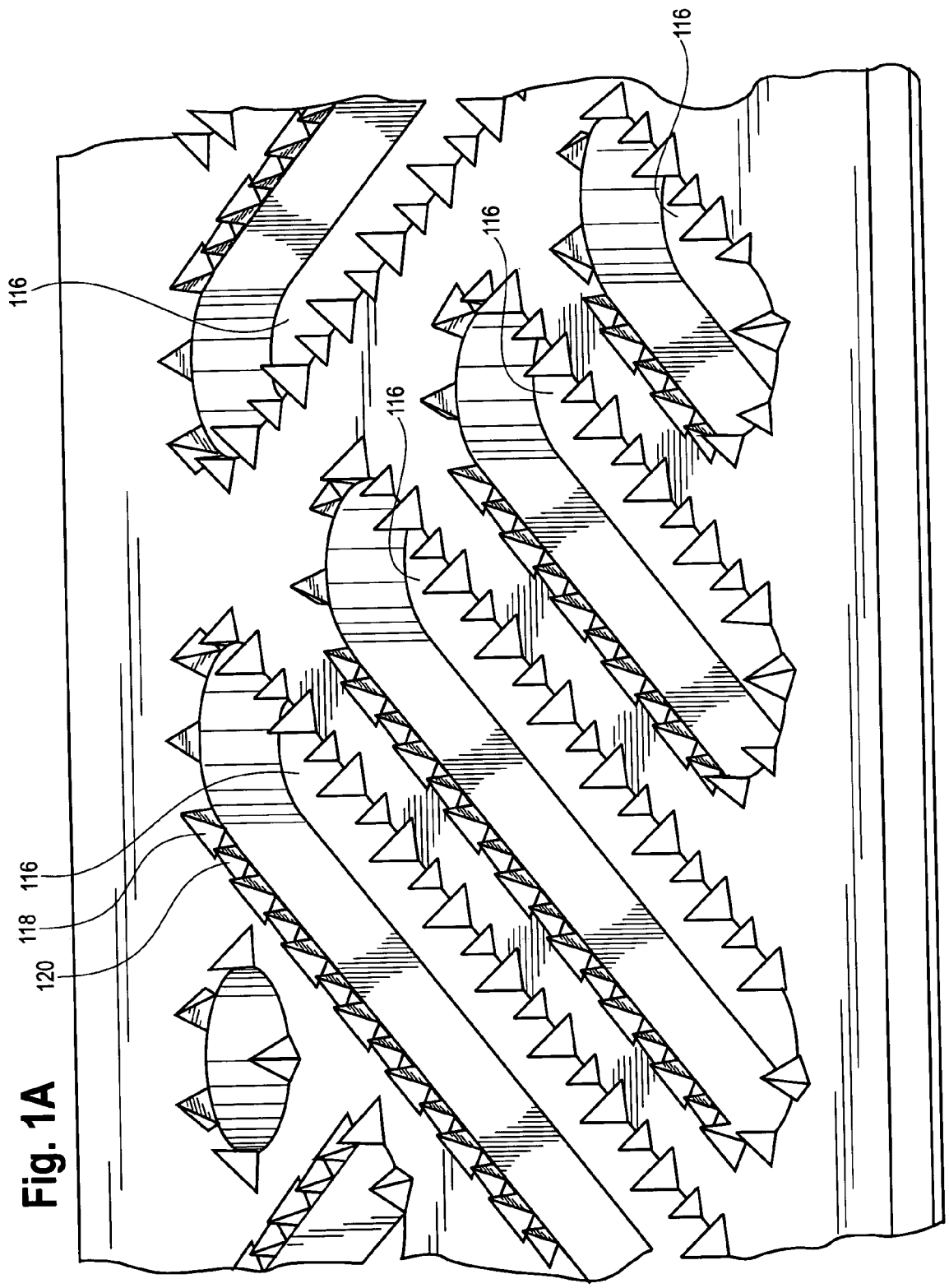
FIG. 1A is an enlarged, fragmentary perspective view taken substantially along line 1A-1A in FIG. 1 illustrating a plurality of protrusions formed on the blade of FIG. 1.

Referring to FIG. 1A, the first and second protrusions 118 and 120 are angled inwardly over each of the openings 116. It should be appreciated that the angle of the first and second protrusions may be any suitable angle or angles. It should also be appreciated that at least one, a plurality or all of the first protrusions may be positioned at the same or different angles from one or more of the second protrusions. The first and second protrusions are engaged by a food item that is slid or moved over the top of the blade 111. The first and second protrusions 118 and 120 extend generally upwardly and cut into at least a portion of the food item to cut, slice or grate a portion of the food item. The cut, sliced or grated food item portions or particles move through the openings 116 on the bottom of the blade 111 and fall into the receptacle 107.

In one embodiment, a grip portion or grip 122 is connected to the housing. The grip 122 is manufactured with a substantially non-skid or non-slip material, such as a suitable elastomer which may be of a type sold under the trademark Santoprene™. In the illustrated embodiment, the grip 122 is attached to or overmolded on the housing 101 and covers the entire outer surface of the skirt portion 108, as well as the upper end of the peripheral wall structure 102. The grip 122 extends under a portion of the bottom edge of the skirt portion 108, as best seen in FIGS. 3 and 4. It should be appreciated that the grip 122 may extend under a portion of the skirt or under a portion or all of the bottom wall of the housing. In the illustrated embodiment, the grip 122 extends about the entire perimeter of the housing 101. It should be appreciated that the grip 122 may extend about a portion or the entire perimeter of the housing. The grip 122 is generally made with at least one of a polymer and an elastomer. The grip 122 provides a comfortable cushioned surface for a user's hand and also helps to minimize the sliding movement of the grater along the support surface 130 while a food item is being cut or grated by the grater.

In operation, a user places the grater 100 on a generally planar, flat or underlying support surface 130 such as a table top or counter top where the bottom or base 106 of the housing 101 and, more specifically, the grip 122, contacts the support surface 130. The user then places one hand flatly on at least a portion of the grip 122 and simultaneously on a portion of the support surface to stably and securely hold the grater in place on the support surface. The user uses the other hand to hold and slide or move a food item, such as a vegetable or a block of cheese, on the top of the blade 111. The cut, sliced or grated food item falls downwardly into the open-top receptacle 107 defined by the housing 101. The grated food item is stored in the container until a desired amount of the grated food item is in the receptacle. The grater 100 therefore enables a user to easily and securely hold the grater in place while grating one or more food items.

Referring to FIG. 2, in one embodiment, the grater 100 includes a cover 126 that snaps onto or connects to the housing 101 using tabs 124. Specifically, the tabs 124 on the housing 101 engage or snap into corresponding indents 115 formed on an inside surface of the cover 126, as best shown in FIG. 3. The engagement of the tabs 124 and indents 115 secure the cover 126 to the housing 101. The cover 126 can also be removed from the housing 101 as necessary. The cover 126 may be made out of the same or a different material than the housing 101 and/or blade 111. In the illustrated embodiment, the tabs 124 are integrally formed with the housing 101. Alternatively, the tabs 124 may be formed on the cover 126 and adapted to engage openings or holes formed on the housing 101. It should be appreciated that any suitable connector or connectors may be used to connect or secure the cover 126 to the housing 101.

Figure 5:
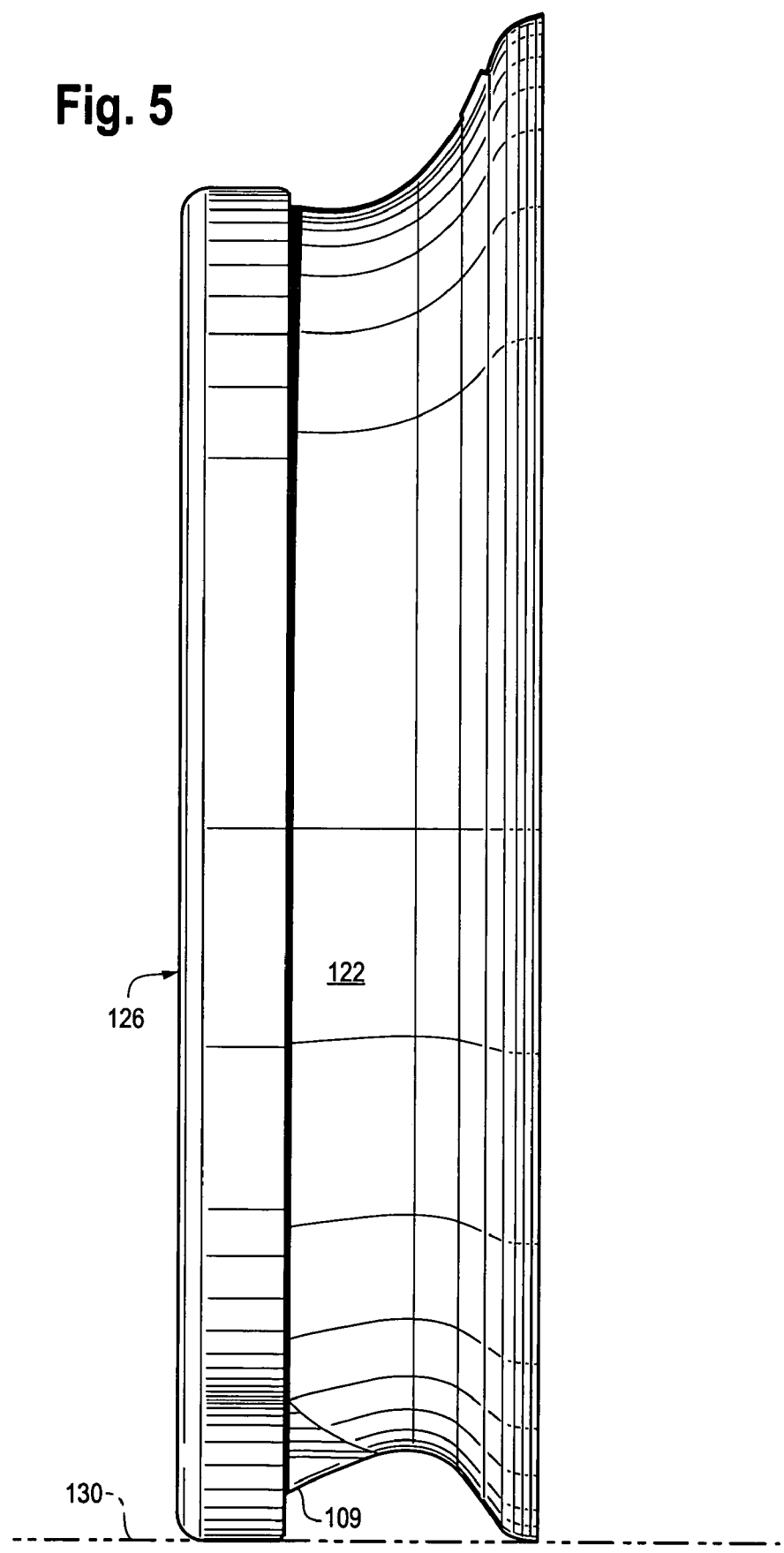
FIG. 5 is a side view of the embodiment of the grater of FIG. 1 including the cover illustrating the grater standing vertically on a support surface for storage.

The grater of the present invention is configured to be stored horizontally or vertically in a cabinet, drawer or other storage area. In FIG. 5, the grater 100 is shown standing generally upright or vertical on the support surface 130. To stand the grater 100 in an upright or vertical position, the end of the grater including the spout 109 is placed on the support surface 130. In this position, the spout 109 and, more specifically, the portion of the cover 126 which covers the spout, and the skirt portion 122 are generally in the same plane and each contact the support surface 130 to act as legs or supports for standing the grater 100 on its end. Storing the grater 100 in the upright or vertical position shown in FIG. 5 significantly minimizes the amount of storage space needed for the grater in cabinets, on countertops and other storage locations.

The housing, blade and other components of the grater may be made with any suitable material or materials such as a stainless steel, wood, glass, a polymer and/or an elastomer or any suitable combination of these materials. The grater may also be made to be any suitable shape or configuration or include any suitable decorative pattern or patterns.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A grater comprising:
a housing including a peripheral wall structure having a top end and a bottom end, and a base connected to said bottom end, said peripheral wall structure and said base cooperating to define a receptacle, said housing including a skin portion located adjacent the bottom end, the skirt portion being separate from and extending away from said base and being engageable by a user's hand to hold the housing in place on an underlying support surface; and
a blade carried by said housing;
said skirt portion being wider than said top end of said peripheral wall structure and receiving a user's hand in a grasping position to simultaneously engage the skirt portion and the underlying support surface.

2. The grater of claim 1, which includes a grip connected to said skirt portion of said housing.

3. The grater of claim 2, wherein said grip is made of at least one of the materials selected from the group consisting of: a polymer and an elastomer.

4. The grater of claim 1, wherein said peripheral wall structure defines a spout operable to drain fluid from said receptacle.

5. The grater of claim 1, wherein said housing is made of at least one of the materials selected from the group consisting of: stainless steel, wood, glass, a polymer and an elastomer.

6. The grater of claim 1, wherein the blade defines a plurality of openings and includes a plurality of protrusions adjacent to the openings.

7. The grater of claim 6, wherein the protrusions have two different sizes.

8. The grater of claim 6, wherein the protrusions are positioned on each side of each opening and angle substantially inwardly.

9. The grater of claim 1, which includes a cover removably connected to the housing.

10. A grater comprising:
a housing including a peripheral wall structure having a top end and a bottom end, and a base connected to said bottom end, said peripheral wall structure and said base cooperating to define a receptacle, said housing including a skin portion located adjacent the bottom end, extending away from said receptacle and being engageable by a user's hand to hold the housing in place on an underlying support surface;
a cover removably connected to the housing; and
a blade carried by said housing;
said skirt portion being wider than said top end of said peripheral wall structure and receiving a user's hand in a grasping position to simultaneously engage the skirt portion and the underlying support surface,
wherein the peripheral wall structure defines a spout, the cover including a protruding member positioned and shaped to overlie the spout for cooperating therewith to define a gap for draining fluid from the grater that collected in the receptacle.

11. The grater of claim 10, wherein said protruding member and an adjacent portion of said skin portion are in substantially the same plane and cooperate to define spaced supports to enable the grater to stand independently and substantially vertically on the underlying support surface.

12. A grater for processing a food item, the grater comprising:
a container including a top, a base and a skirt portion, the skirt portion located adjacent the base, being separate from and extending away from the base, said skirt portion being wider than said top of said container;
a grip attached to said skirt portion and positioned to inhibit movement of said container along an underlying support surface; and
a blade carried by the container,
the skirt portion and attached grip adapted to receive a user's hand in a grasping position, wherein the user's hand simultaneously engages at least one of the skirt portion and the attached grip, as well as the underlying support surface to securely hold the container in place on the underlying support surface.

13. The grater of claim 12, wherein the grip is made of a substantially non-skid material.

14. The grater of claim 12, wherein the grip is made of at least one of the materials selected from the group consisting of: a polymer and an elastomer.

15. The grater of claim 12, wherein the housing is made of at least one of the materials selected from the group consisting of: stainless steel, wood, glass, a polymer and an elastomer.

16. The grater of claim 12, wherein the blade defines a plurality of openings and includes a plurality of protrusions adjacent to the openings.

17. The grater of claim 16, wherein the protrusions have two different sizes.

18. The grater of claim 16, wherein the protrusions are positioned on each side of each opening and angle substantially inwardly.

19. The grater of claim 12, which includes a cover removably connected to the container.

20. The grater of claim 12, wherein the grip extends beneath the skirt portion.

21. The grater of claim 12, wherein the grip overlies the skin portion.

22. A grater for processing a food item, the grater comprising:
a container including a top, a bottom and a skin portion which extends downwardly and away from the container, said skirt portion being wider than said top of said container;
a grip attached to said skirt portion and positioned to inhibit movement of said container along an underlying support surface;
a cover removably connected to the container; and
a blade carried by the container,
the skirt portion and attached grip adapted to receive a user's hand in a grasping position, wherein the user's hand simultaneously engages at least one of the skirt portion and the attached grip, as well as the underlying support surface to securely hold the container in place on the underlying support surface,
wherein the cover includes a protruding member positioned and shaped to overlie a spout defined by the housing for cooperating therewith to define a gap for draining fluid from the grater that collected in the container.

23. The grater of claim 22, wherein said protruding member and an adjacent portion of said skirt portion are in substantially the same plane and cooperate to define spaced supports to enable the grater to stand independently and substantially vertically on the underlying support surface.

24. A grater comprising:
a housing having a top and a bottom, said housing defining a receptacle and a skirt portion, said receptacle having a base, said skirt portion located adjacent the bottom, extending laterally outwardly beyond said top of said housing, being separate from and extending away from said base and being engageable by a user's hand to hold the housing in place on an underlying support surface; and
a blade carried by said housing,
said skirt portion receiving a user's hand in a grasping position to simultaneously engage the skirt portion and the underlying support surface.

* * * * *

UNITED STATES PATENT AND TRADEMARK OFFICE
CERTIFICATE OF CORRECTION

PATENT NO. : 7,469,848 B2
APPLICATION NO. : 11/288501
DATED : December 30, 2008
INVENTOR(S) : Yamanaka et al.

It is certified that error appears in the above-identified patent and that said Letters Patent is hereby corrected as shown below:

<u>Column 7</u> line 33 "skin" should be "skirt".

<u>Column 8</u> line 20 "skin" should be "skirt"

Signed and Sealed this

Twenty-fourth Day of March, 2009

JOHN DOLL
*Acting Director of the United States Patent and Trademark Office*